(12) United States Patent
Letourneur et al.

(10) Patent No.: US 8,173,903 B2
(45) Date of Patent: May 8, 2012

(54) FIXING DEVICE FOR WIRE CABLE TRAY

(75) Inventors: Mickael Letourneur, Vandelicourt (FR); Stephane Quertelet, Remy (FR)

(73) Assignee: I.C.M. Group, Montbard (FR)

( * ) Notice: Subject to any disclaimer, the term of this patent is extended or adjusted under 35 U.S.C. 154(b) by 282 days.

(21) Appl. No.: 12/525,215

(22) PCT Filed: Jan. 31, 2008

(86) PCT No.: PCT/FR2008/000114
§ 371 (c)(1),
(2), (4) Date: Jul. 30, 2009

(87) PCT Pub. No.: WO2008/110687
PCT Pub. Date: Sep. 18, 2008

(65) Prior Publication Data
US 2010/0059250 A1 Mar. 11, 2010

(30) Foreign Application Priority Data

Jan. 31, 2007 (FR) ..................................... 07 52993

(51) Int. Cl.
*H02G 3/04* (2006.01)
(52) U.S. Cl. ............ 174/135; 174/47; 403/329; 248/49; 211/119
(58) Field of Classification Search .................. 174/135, 174/47; 403/329; 248/49; 211/119
See application file for complete search history.

(56) References Cited

U.S. PATENT DOCUMENTS

| 5,531,410 | A | * | 7/1996 | Simon | 248/49 |
| 5,927,658 | A | * | 7/1999 | Gerster | 248/49 |
| 6,239,364 | B1 | * | 5/2001 | Nickel | 174/480 |
| 6,590,154 | B1 | | 7/2003 | Badey et al. | |
| 7,468,491 | B2 | * | 12/2008 | Deciry et al. | 174/480 |

FOREIGN PATENT DOCUMENTS

| EP | 1 406 362 | 4/2004 |
| FR | 2 796 121 | 1/2001 |
| FR | 2 864 361 | 6/2005 |

OTHER PUBLICATIONS

International Search Report dated Oct. 2, 2008, from corresponding PCT application.

\* cited by examiner

*Primary Examiner* — Dhirubhai R Patel
(74) *Attorney, Agent, or Firm* — Young & Thompson

(57) ABSTRACT

The invention relates to a device for a yarn cable track (6) including longitudinal warp yarns (8) and transverse weft yarns (10), that includes a base (2) with a mounting surface (16) on the cable track as well as an attachment means (4; 34, 38, 38'). The device further includes: at least one trough-shaped longitudinal housing (18) for receiving a first yarn of the cable track and formed in the mounting surface (16); at least one bearing surface (20) made as an undercut relative to the mounting surface (16), said surface extending perpendicularly to the longitudinal housing (18) and parallel to the bottom (22) of the longitudinal housing (18) at an intermediate level between the bottom (22) of said housing (18) and the mounting surface (16); and at least one transverse cut-out (24) corresponding to each intersection between a longitudinal housing and a bearing surface, said cut-out (24) extending from one edge of the mounting surface (16) to a longitudinal housing (18).

10 Claims, 8 Drawing Sheets

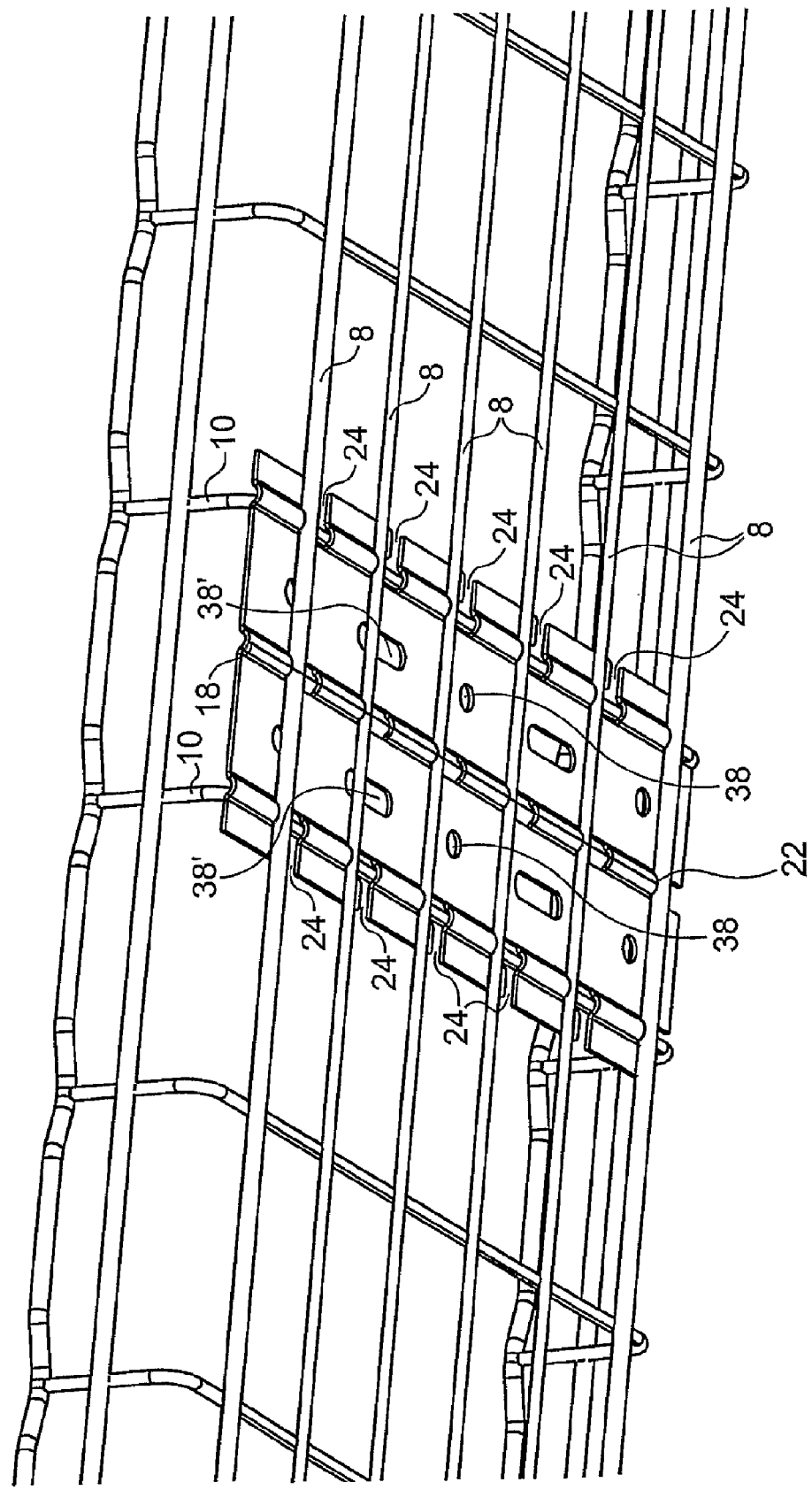

FIXING DEVICE FOR WIRE CABLE TRAY

The present invention concerns a fixing device for wire cable trays.

BACKGROUND OF THE INVENTION

In the manner known in the art, wire cable trays take the form of a channel consisting of wire mesh. This mesh includes longitudinal wires, usually called warp wires, and transverse wires called weft wires. The warp wires are rectilinear, or substantially rectilinear, and are welded to the weft wires. The latter generally have an overall U-shape and are disposed with a regular pitch along the warp wires. Thus, overall, a cable tray includes three panels, namely a bottom panel and two lateral panels.

Such cable trays are commonly used to accommodate, support and protect flexible conduits of diverse kinds: electrical cables (low-voltage or high-voltage), data transmission cables (telephone, optical fiber, etc.), fluid pipes, etc.

It is sometimes required to group cables together in a cable tray to form a bundle of cables in the cable tray and to fix this bundle into the cable tray. A cable tie is then used, for example, which surrounds the cables concerned and a warp wire of the cable tray.

It can also be required to fix an accessory in the cable tray. The classic solution is then to bolt it into the bottom of the cable tray or to a lateral flange.

SUMMARY OF THE INVENTION

The present invention has the object of providing a device for fixing elements—cable bundle, accessory, sundry objects, etc.—into a cable tray. This device can preferably on the one hand be fitted to numerous types of cable tray and on the other hand be mounted quickly, without ancillary parts (bolts, etc.) and without tools. This device can advantageously also be fitted on site as required.

To this end, the invention proposes a fixing device for wire cable trays including on the one hand longitudinal warp wires and on the other hand transverse weft wires, having a base with a mounting face by which it is mounted on the cable tray and fixing means.

According to the invention, this fixing device includes:
- at least one trough-shaped longitudinal housing intended to receive a first wire of the cable tray (warp wire or weft wire) and produced in the mounting face,
- at least one bearing surface undercut relative to the mounting face, said surface extending perpendicularly to the longitudinal housing and being disposed parallel to the back of the longitudinal housing at an intermediate level between the back of that housing and the mounting face, and
- at least one transverse cut-out corresponding to each intersection between a longitudinal housing and a bearing surface, this cut-out extending from one edge of the mounting face to a longitudinal housing.

This device can easily be fitted, without tools, to a cable tray. A first wire of the cable tray (warp wire or weft wire) bears on the bottom of the trough-shaped housing while a second wire of the cable tray (weft wire or warp wire) bears on the bearing surface, thereby retaining the device with a clamping force depending on the distance between the bottom of the trough and the bearing surface. Here mounting is effected by bearing on two faces (edges) of wires of the cable tray that are welded together. Thus the diameter of the wires used is of no consequence.

In a first embodiment, a fixing device of the invention has a plurality of similar longitudinal housings disposed parallel to each other at a regular pitch.

In a second embodiment, a fixing device of the invention includes a plurality of similar transverse cut-outs disposed parallel to each other at a regular pitch.

By adapting to the shapes in which cable trays are produced, these two embodiments offer improved retention to enable the fixing of an accessory on which a greater or lesser load is exerted.

When there are both a number of longitudinal housings and a number of transverse cut-outs, the pitch between the longitudinal housings is preferably the same as that between the transverse cut-outs. The fixing device can then be mounted in two different mutually perpendicular orientations on the cable tray.

For improved retention on the cable tray on which the device of the invention is mounted, a boss can be produced on the bearing surface. Fitting is then effected by clipping.

In one embodiment of the device of the invention the base is produced in a molded synthetic material. In this case, this fixing device is associated for example with a cable retaining device. One such cable retaining device is described in U.S. Pat. No. 7,107,653, for example.

In another embodiment the base of the device of the invention is produced in sheet metal cut and bent to shape. The fixing means of this device then take the form of circular bores and/or oblong holes produced in the sheet.

The present invention also concerns an embodiment of a fixing device including a single trough-shaped longitudinal housing, a single transverse cut-out and two bearing surfaces disposed on opposite sides of the longitudinal housing. This particularly advantageous embodiment places the device at the intersection of a warp wire and a weft wire.

Finally, the present invention also concerns an assembly including on the one hand a section of cable tray having longitudinal warp wires and U-shaped transverse weft wires and on the other hand a fixing device as described above, this assembly being characterized in that the base of the fixing device is inside the section of cable tray, that is to say between the branches of the U-shape of the weft wires, and in that each longitudinal housing receives a warp wire. In this advantageous embodiment, the fixing device is mounted by positioning said device in the cable tray and sliding it along a warp wire. This is advantageous because if cables have already been placed in the section of cable tray, the movement to fix the fixing device is parallel to the cables already in place and can therefore be performed easily. Movements when fixing a cable tray to a support or the like generally entail sliding along a weft wire and thus in a direction perpendicular to any cables in the cable tray.

BRIEF DESCRIPTION OF THE DRAWINGS

Details and advantages of the present invention will emerge more clearly from the following description, given with reference to the appended diagrammatic drawings, in which:

FIG. 8 is a perspective view from below of another embodiment of a fixing device of the invention mounted in a wire cable tray.

DETAILED DESCRIPTION OF THE PREFERRED EMBODIMENTS

Figure 1:
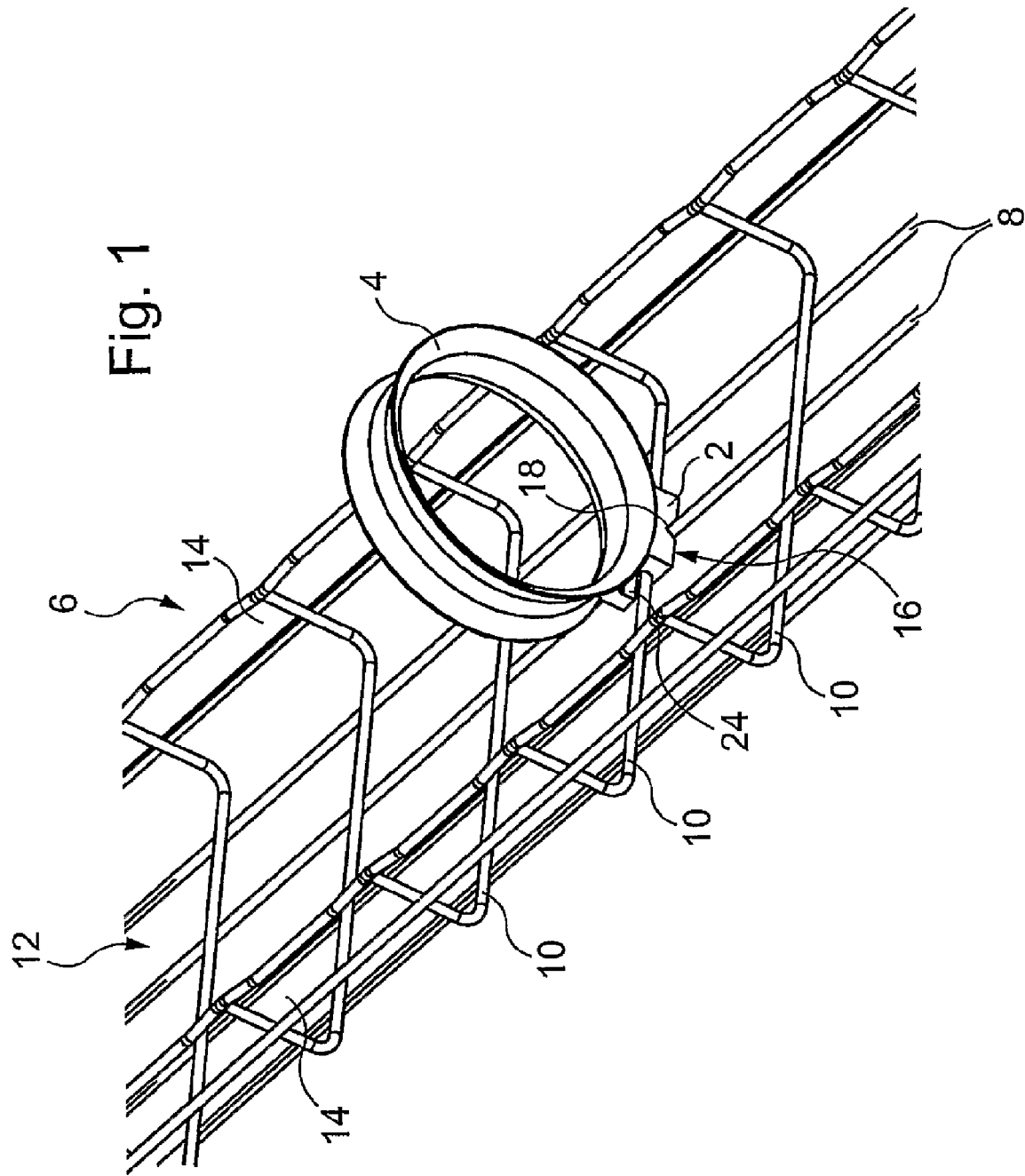
FIG. 1 represents diagrammatically a fixing device of the invention mounted in a wire cable tray.

FIGS. 1 to 4 represent a first embodiment of a fixing device of the invention. This device includes on the one hand a base 2 and a cable retaining device 4. It is produced in one piece, for example by molding a synthetic material.

The base 2 is intended to enable fixing of the fixing device of the invention to a section of wire cable tray 6. In the conventional way, and as represented in the drawings, this cable tray is gutter-shaped and includes longitudinal wires 8 called warp wires and transverse wires 10 called weft wires. The warp wires 8 are rectilinear (except for the edge wires in the embodiment represented, which are nevertheless substantially rectilinear). The weft wires 10 are U-shaped. The section of cable tray 6 therefore has a bottom panel 12 and two lateral panels 14. It is assumed here that the bottom panel 12 is at the bottom of the lateral panels. This bottom panel 12 is disposed in a substantially horizontal plane whereas the lateral panels 14 extend substantially vertically. Such an orientation is usual for a section of cable tray. Other orientations can nevertheless be envisaged, for example with the bottom panel 12 disposed vertically or inclined.

The base 2 has a mounting face 16 which, in a preferred embodiment, is a substantially plane face. A trough-shaped housing 18 is produced in the mounting face 16. This housing 18 forms a groove extending the entire length of the mounting face 16 intended to receive a wire of the section of cable tray, a warp wire 8 in the orientation chosen for FIGS. 1 to 4. Here this housing 18 is considered to extend longitudinally. There is thus defined an orientation that corresponds to the orientation of the section of cable tray 6 represented, but as will emerge hereinafter, the fixing device of the invention can equally be fixed to the section of cable tray 6 oriented so that the housing 18 extends transversely relative to said section.

Figure 2:
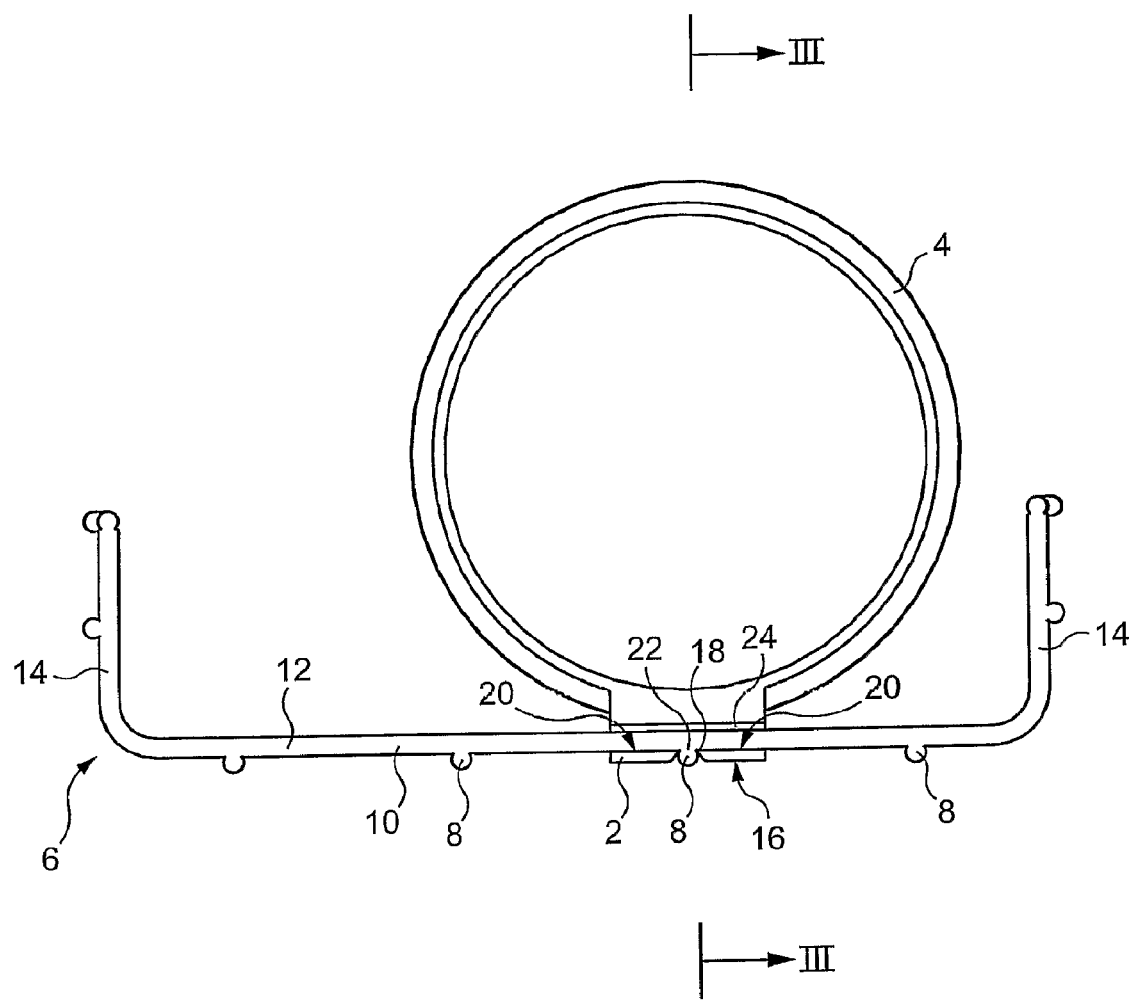
FIG. 2 is a view of the fixing device from FIG. 1 in cross section.

FIGS. 1 and 2 show the trough shape of the housing 18. The back of this housing, which in the chosen orientation is at the top of the housing 18, preferably has a radius of curvature adapted to the diameters of the wires intended to be placed in the housing 18. If warp or weft wires with different diameters are to be housed in the housing 18, the latter will preferably have a radius of curvature corresponding to the larger wire radius. The housing 18 having another shape can nevertheless be envisaged: it could be V-shaped, for example, or some other shape.

The base 2 also has a bearing surface 20 set back relative to the mounting face 16. This bearing surface 20 extends perpendicularly to the housing 18. It is parallel to the back line 22 of the housing 18. In the embodiment shown here, which is a preferred embodiment, it is also parallel to the mounting face 16.

The bearing surface 20 is between the mounting face 16 and the back line 22 of the housing 18. The distance between the bearing surface 20 and the back line 22 (which is parallel to it) is a few tenths of a millimeter.

Figure 3:
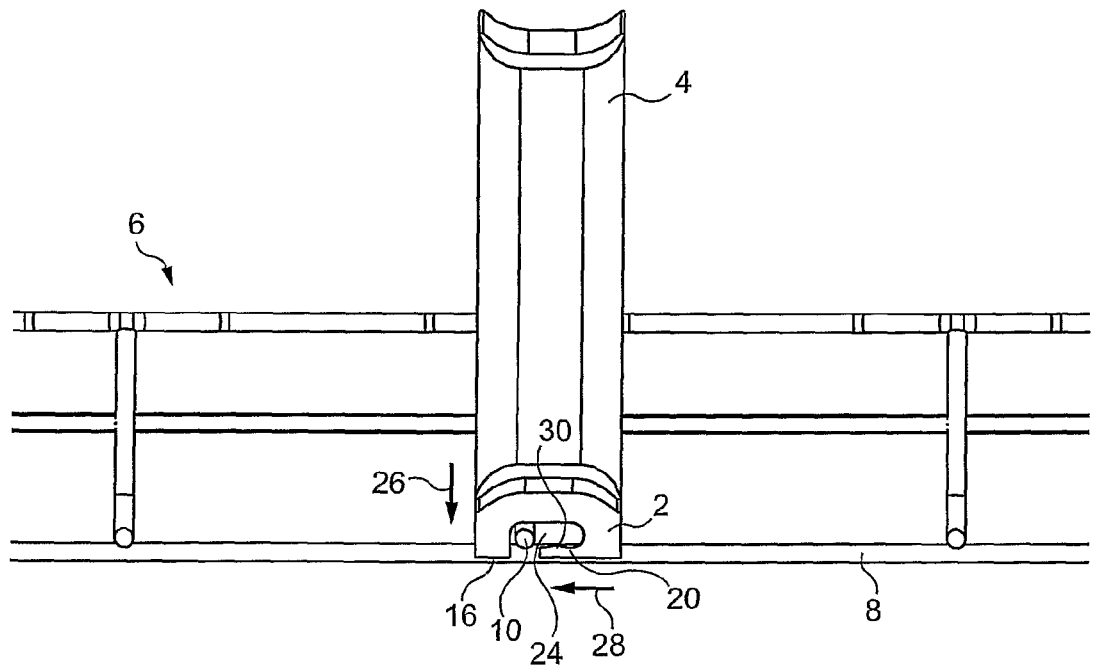
FIG. 3 is a view in longitudinal section on the section plane III-III in FIG. 2 during mounting of the fixing device on the cable tray.

A transverse cut-out 24 provides access from the mounting face 16 to the bearing surface 20. This cut-out is seen in FIG. 3 in particular. The bearing surface 20 being intended to serve as a support for a wire of the cable tray on which the fixing device is mounted, the transverse cut-out 24 enables that wire to pass from the mounting face 16 to the bearing surface 20. Thus this transverse cut-out 24 opens into the mounting face 16. In the embodiment represented in FIGS. 1 to 4, the transverse cut-out 24 forms with the housing 18 a cross. This transverse cut-out 24 extends either side of the longitudinal housing 18 to the corresponding edge of the mounting face 16 of the base.

As FIG. 3 shows, this transverse cut-out 24 is L-shaped. One branch of this L-shape is perpendicular to the mounting face 16 while the other branch of this L-shape is parallel to the bearing surface 20. Accordingly, in order to bear on the surface 20, a wire of the cable tray, a weft wire 10 in FIGS. 1 to 4, is first placed parallel to the mounting face 16 and perpendicular to the longitudinal housing 18. This weft wire 10 then penetrates through the transverse cut-out 24 in the base 2, after which it is slid parallel to the mounting face 16, parallel to the bearing surface 20, to take up a position on this undercut bearing surface 20.

Figure 4:
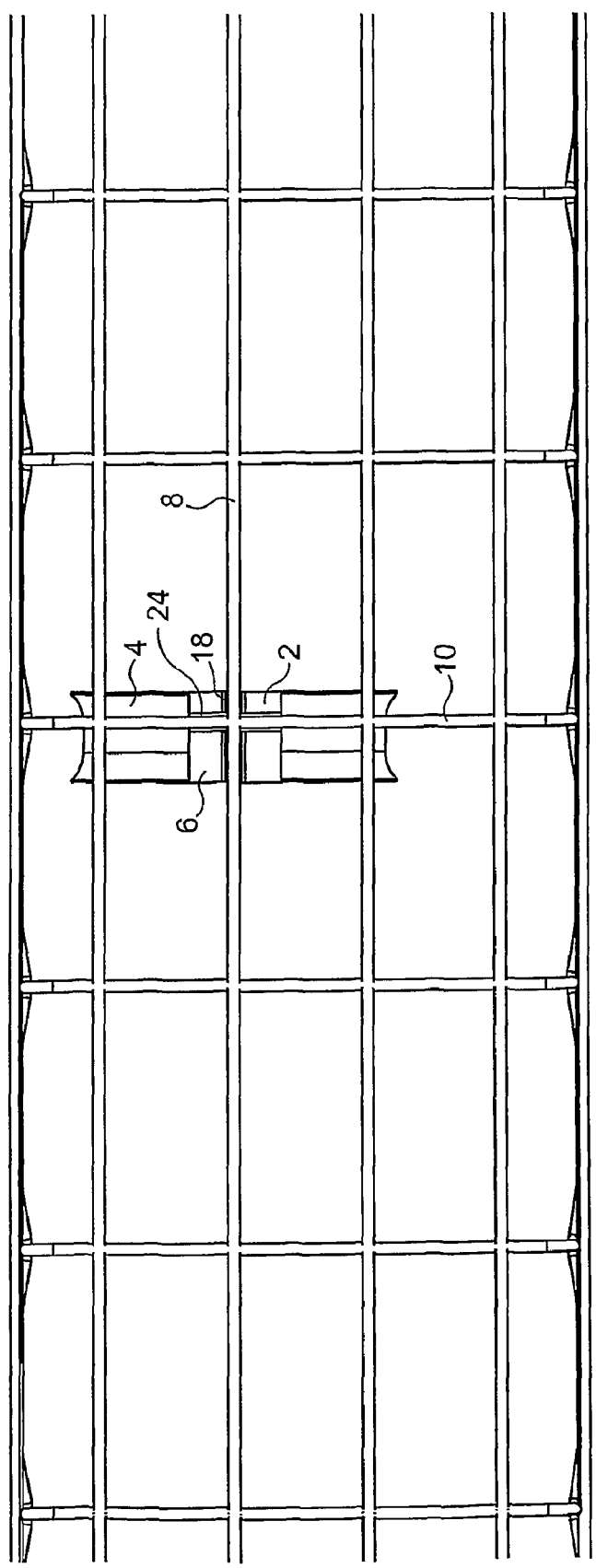
FIG. 4 is a view from below corresponding to the mounting step from FIG. 3.

Arrows in FIG. 3 show the mounting of the fixing device on the section of cable tray 6. Thus the base 2 is first positioned at an intersection between a warp wire 8 and a weft wire 10 so that the cross formed by the housing 18 and the transverse cut-out 24 coincides with the intersection of the wires of the cable tray where the fixing device is to be placed (FIG. 4). In the situation represented, the longitudinal housing 18 faces a warp wire 8 while the transverse cut-out 24 faces a weft wire 10.

The base 2 is then moved vertically downward (in the chosen orientation, see above) indicated by the first arrow 26 in FIG. 3. The warp wire 8 then comes to rest on the back of the longitudinal housing 18 (FIG. 3 position). The base 2 is finally pushed in the longitudinal direction, as indicated by the second arrow in FIG. 3. The weft wire 10 then slides on the bearing surface 20, for example until it abuts on the back of the cut-out, as shown in FIG. 1. This movement is guided by the warp wire 8 sliding in its housing 18.

The fixing device of the invention, once mounted, is retained on the one hand by the back of the housing 18 bearing on the warp wire 8 and on the other hand by the weft wire 10 bearing on the bearing surfaces 20. There can be a slight clamping effect here to retain the device of the invention on the section of cable tray 6 by adapting the distance between the back line 22 of the housing 18 and the bearing surfaces 20. This device is then retained thanks to this clamping effect without having to use any tools. Moreover, if cables (not shown) are present in the section of cable tray 6, mounting can be effected anyway because, during mounting, fixing is effected by a longitudinal movement, which is parallel to the cables. Because of this, the cables do not greatly impede the fixing of the device.

In the embodiment of FIGS. 1 to 4, the base 2 is produced in a synthetic material having relatively high elasticity (compared to sheet metal). A boss 30 is then provided for improved retention of the fixing device (or its base 2) to the section of cable tray 6. This boss 30 is produced near the edge of the bearing surface 20 on the same side as the transverse cut-out 24. It is positioned to leave sufficient room between it and the back of the transverse cut-out 24 to accommodate the wires of greater diameter intended to bear on the bearing surfaces 20.

The cable retaining device 4 is shown diagrammatically in FIGS. 1 to 4 as a ring. This ring is preferably covered, but this opening enabling introduction of cables is not represented in the drawings. This is a retaining device like that described in U.S. Pat. No. 7,107,653, for example. Such a device enables rapid placement of cables to retain them. This retention is furthermore reversible. The device can thus be opened and closed at will to add or remove a cable.

Figure 5:
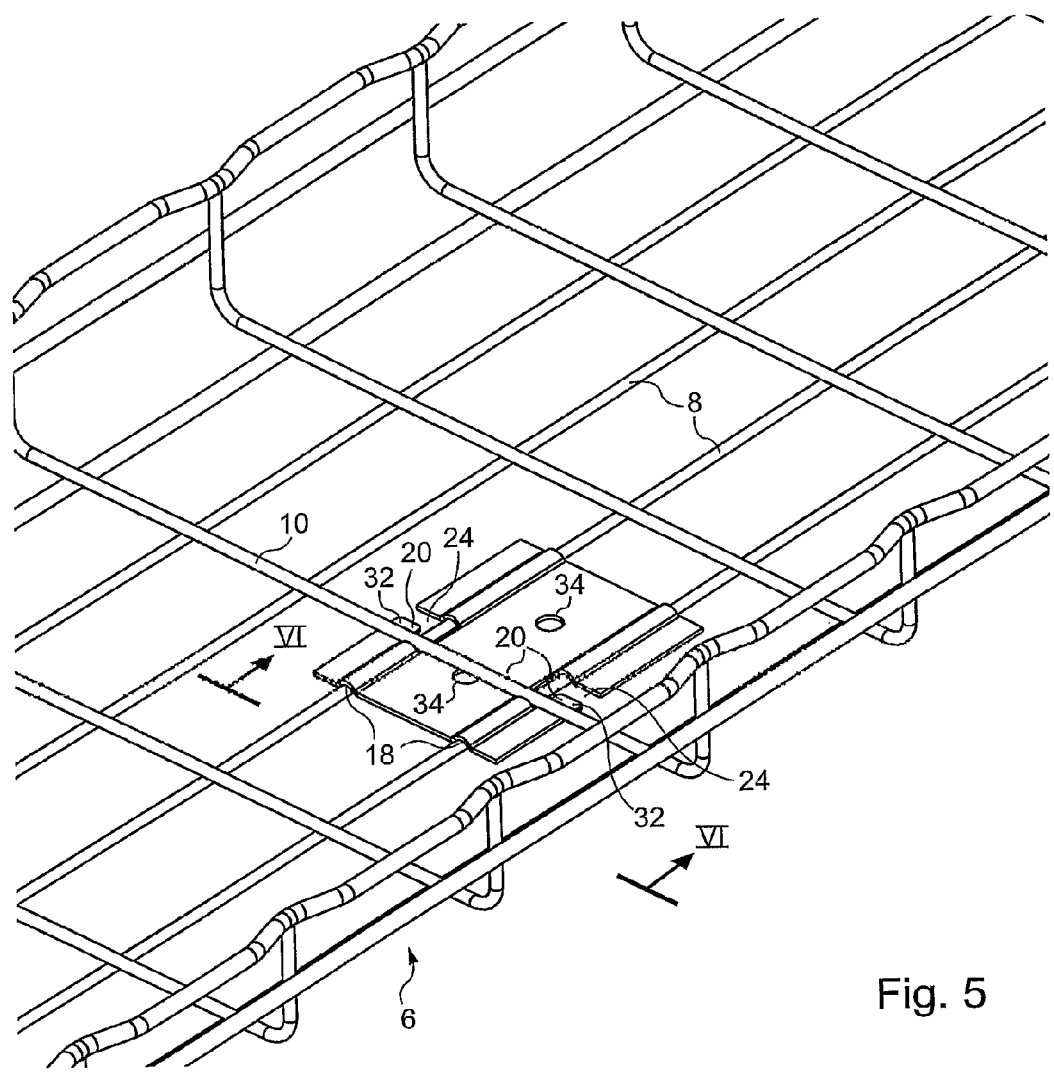
FIG. 5 is a perspective view of a different embodiment of a fixing device mounted in a wire cable tray.
Figure 6:
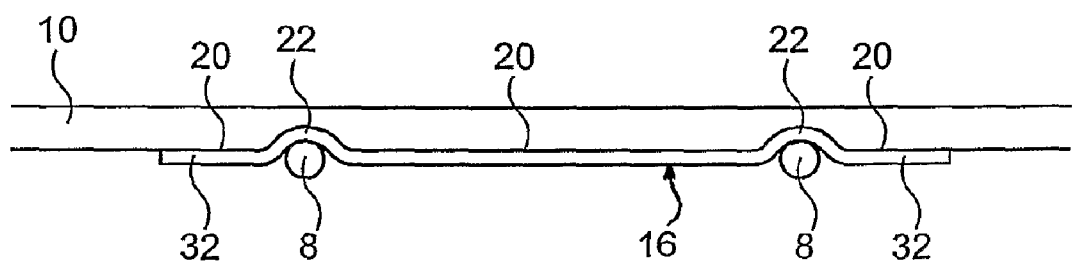
FIG. 6 is a view in section taken along the line VI-VI in FIG. 5.

FIGS. 5 and 6 show another embodiment of a fixing device of the invention. This embodiment is in sheet metal. For this and subsequent embodiments, elements similar to those of the first embodiment of FIGS. 1 to 4 have the same references as in those figures.

On the device of FIGS. 5 and 6, there is a mounting face 16 with two longitudinal housings 18 and a transverse cut-out 24 for each of the housings 18. The mounting face 16 is the lower face of the fixing device and is not visible in FIG. 5. The device is produced from sheet metal by cutting and pressing. Thus the formation of the housings 18 in the mounting face 16 produces a rib on the face of the sheet opposite the housings 18.

The two transverse cut-outs 24 extend in each case from a longitudinal housing 18 to an edge of the mounting face 16. They are aligned and thus correspond to the same weft wire 10 (or warp wire 8). Each transverse cut-out 24 here defines a tongue 32 one face of which, that opposite the mounting face 16, is part of the bearing surface 20.

To enable the fixing of any accessory, the fixing device includes fixing means which, in the embodiment shown (see FIG. 5), are two bores 34 of circular shape.

To mount this fixing device on the section of cable tray 6 as shown in FIG. 5, the mounting face 16 is placed on the bottom panel 12 of the section of cable tray 6 so that the longitudinal housings 18 face two warp wires 8. The fixing device is introduced via the interior of the section of cable tray (the interior corresponding to the space between the branches of the U-shape of the cable tray) and the concave face of the housings 18 is oriented toward the exterior of the section of cable tray. A weft wire 10 is level with the transverse cut-outs 24, more particularly where the transverse cut-outs open into the mounting face 16. The warp wires 8 then take their place in the housings 18. The fixing device is then slid longitudinally so that the weft wire 10 passes over the tongues 32 and thus comes to bear on the corresponding bearing surface 20. This latter movement is guided by the warp wires 8 sliding in the longitudinal housings 18.

In this sheet metal embodiment, having only one longitudinal housing 18 and only one transverse cut-out 24 can be envisaged. There are then two bearing surfaces 20 disposed on opposite sides of the longitudinal housing 18. Thus the device can be mounted at the crossover of a warp wire and a weft wire of the section of cable tray.

Figure 7:
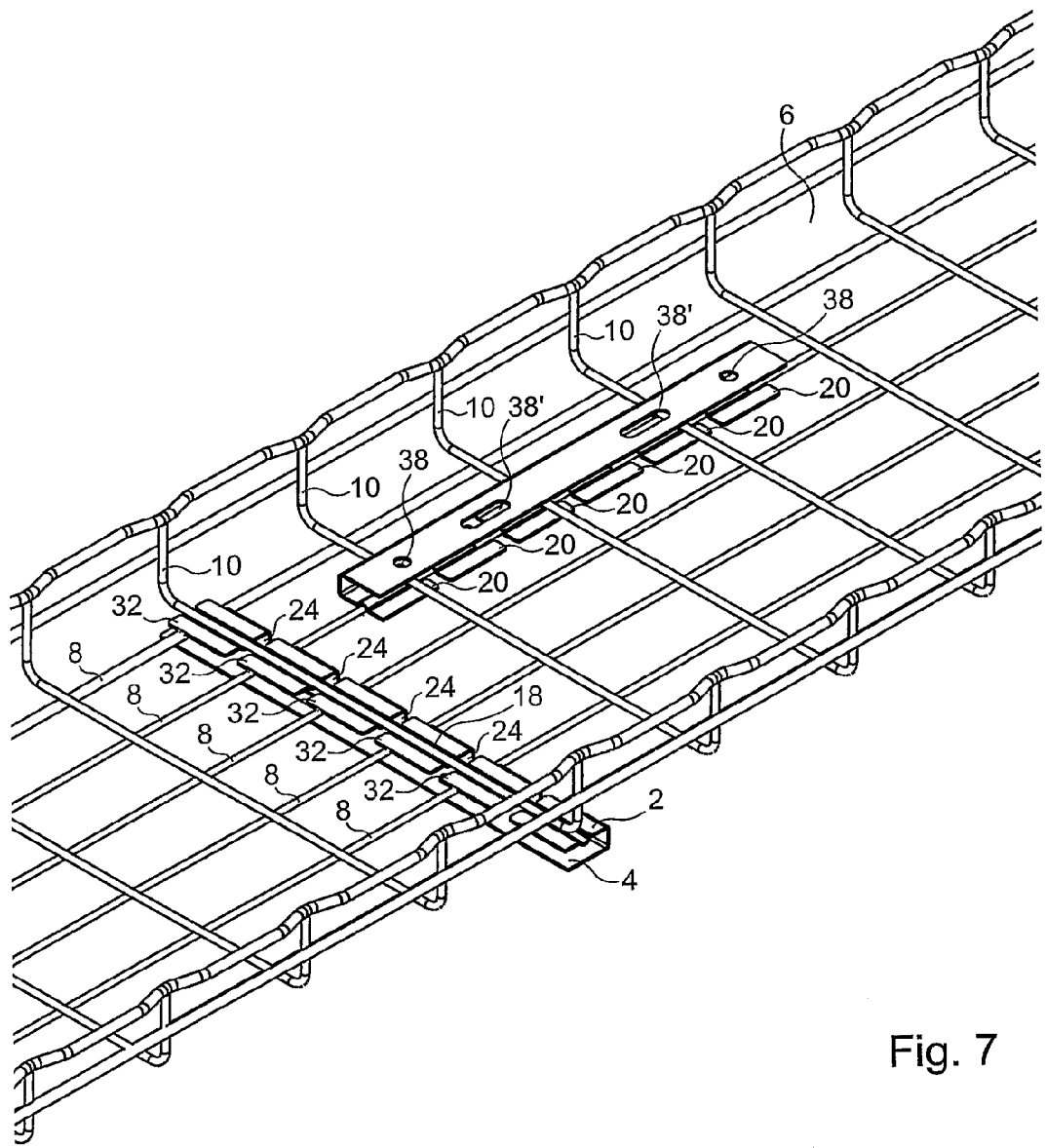
FIG. 7 is a perspective view showing two fixing devices of another embodiment mounted in a cable tray.

FIG. 7 shows another embodiment of a fixing device of the invention. Two identical fixing devices are represented in this figure. This figure shows how the same fixing device of the invention can be fixed with two different orientations, either inside a section of cable tray 6 or outside it.

The fixing device represented here is also produced in sheet metal. It includes a base 2 having a mounting face 16 and a fixing plate 36. This fixing device is also produced by pressing and bending sheet metal. The fixing plate 36 is provided with bores 38 of circular shape and oblong holes 38'.

The mounting face 16 of this fixing device includes a longitudinal housing 18 and six transverse cut-outs 24. The transverse cut-outs 24 are regularly spaced with a regular pitch, for example a pitch of 50 mm. This pitch corresponds to the pitch between two adjacent warp wires. The pitch between two weft wires is twice that between the warp wires, i.e. 100 mm. These numerical values are given by way of nonlimiting example, but correspond to values currently found on some cable trays. The fact of having warp wires and weft wires with separation pitches of which one is a multiple of the other enables mounting of the fixing device in the two positions shown in FIG. 7. In one mounting position, the longitudinal housing 18 receives a weft wire 10, whereas in the other mounting position it receives a warp wire 8. In the first mounting the fixing device is mounted on a weft wire and six warp wires whereas in the second mounting position the fixing device is mounted on one warp wire and three weft wires.

This mounting in two different directions is illustrated by the embodiment represented in FIG. 7, but it is clear that the other embodiments described above, and many other embodiments of the invention, also enable such mountings on the same cable tray.

FIG. 8 shows by way of illustration another embodiment in sheet metal. The fixing device of this embodiment includes three longitudinal housings 18 and is intended to be mounted on two weft wires and six warp wires or three warp wires and three weft wires.

Of course, embodiments with a plurality of longitudinal housings 18 and/or a plurality of transverse cut-outs 24 can be produced for bases of synthetic material fixing devices of the type shown in FIGS. 1 to 4.

The fixing devices described above can be considered as universal fixing devices because each can be used on cable trays produced with wires of different diameters: they can be used on a cable tray using wires of different diameters, but they can also be used on two different cable trays produced with wires of different diameters. Furthermore, fixing devices whose mounting face includes a longitudinal housing and a transverse cut-out can adapt to any intersection of two wires of a cable tray and can be mounted at will essentially inside the cable tray or outside it. A device of the invention thus enables fixing of an accessory intended to be located inside a cable tray or outside it.

Note further that the mounting of these devices is easy and can be effected without tools. These sections can be mounted on demand on site when fitting a cable tray with no auxiliary parts, such as bolts or the like.

Even if a device of the invention can be produced in bent and cut sheet metal, it is a device offering good accuracy and high stiffness. A molded synthetic material embodiment also provides good accuracy. It has the advantage of not being aggressive to cables intended to be placed in the cable tray.

The devices described are essentially intended to be mounted in a section of cable tray but mounting versions with a plurality of longitudinal housings and/or a plurality of transverse cut-outs between two sections of cable tray can also be envisaged.

The present invention is not limited to the embodiments described above by way of nonlimiting example and to the variants referred to. It concerns equally all variants evident to the person skilled in the art within the scope of the following claims.

The invention claimed is:

1. A fixing device for a wire cable tray (6) that comprise longitudinal warp wires (8) and transverse weft wires (10), comprising:
   a base (2) with a mounting face (16) by which the base mounts to the cable tray; and
   fixing means (4; 34, 38, 38'), which comprises
      at least one trough-shaped longitudinal housing (18) in the mounting face (16) configured to receive a first wire of the cable tray,
      at least one bearing surface (20) undercut relative to the mounting face (16), said bearing surface extending perpendicularly to the longitudinal housing (18) and being disposed parallel to a back (22) of the longitudinal housing (18) at an intermediate level between the back (22) of and the mounting face (16), and at least one transverse cut-out (24) corresponding to an intersection between the longitudinal housing (18) and the bearing surface (20), the cut-out (24) extending from one edge of the mounting face (16) to the longitudinal housing (18), wherein a plurality of said longitudinal housings (18) are disposed parallel to each other at a regular first pitch, and a plurality of said transverse cut-outs (24) are disposed parallel to each other at a regular second pitch, the first pitch between the longitudinal housings (18) being the same as the second pitch between the transverse cut-outs (24).

2. The device according to claim 1, wherein a boss (30) is formed on the bearing surface (20).

3. The device according to claim 1, wherein the base (2) is sheet metal cut and bent to shape.

4. The device according to claim 3, wherein the fixing means is formed of any of circular bores (34; 38) and oblong holes (38') in the sheet metal.

5. An assembly comprising:
a section of a cable tray that includes longitudinal warp wires (8) and transverse U-shaped weft wires (10); and
a fixing device according to claim 1,
wherein the base (2) of the fixing device is inside a section of the cable tray between branches of a U-shape of the weft wires, and
wherein the longitudinal housing (18) receives one of said warp wires (8).

6. A fixing device for a wire cable tray (6) that comprise longitudinal warp wires (8) and transverse weft wires (10), comprising:
a base (2) with a mounting face (16) by which the base mounts to the cable tray; and
fixing means (4; 34, 38, 38'), which comprises
a single trough-shaped longitudinal housing (18) in the mounting face (16) configured to receive a first wire of the cable tray,
two bearing surfaces (20) undercut relative to the mounting face (16), said bearing surface extending perpendicularly to the longitudinal housing (18) and being disposed parallel to a back (22) of the longitudinal housing (18) at an intermediate level between the back (22) of and the mounting face (16), and
a single transverse cut-out (24) corresponding to an intersection between the longitudinal housing (18) and the bearing surface (20), the cut-out (24) extending from one edge of the mounting face (16) to the longitudinal housing (18),
wherein said two bearing surfaces (20) are disposed on opposite sides of the longitudinal housing (18).

7. The device according to claim 6, wherein a boss (30) is formed on the bearing surfaces (20).

8. The device according to claim 6, wherein the base (2) is sheet metal cut and bent to shape.

9. The device according to claim 8, wherein the fixing means is formed of any of circular bores (34; 38) and oblong holes (38') in the sheet metal.

10. An assembly comprising:
a section of a cable tray that includes longitudinal warp wires (8) and transverse U-shaped weft wires (10); and
a fixing device according to claim 6,
wherein the base (2) of the fixing device is inside a section of the cable tray between branches of a U-shape of the weft wires, and
wherein the longitudinal housing (18) receives one of said warp wires (8).

* * * * *